United States Patent [19]

Oswald et al.

[11] 4,317,737
[45] Mar. 2, 1982

[54] POLYOLEFIN BASED GREASES GELLED BY CLAYS OVERTREATED BY HIGHER DIALKYL DIMETHYL AMMONIUM SALTS

[75] Inventors: Alexis A. Oswald, Mountainside; Gary L. Harting, Westfield; Harry W. Barnum, Brookside, all of N.J.

[73] Assignee: Exxon Research & Engineering Co., Florham Park, N.J.

[21] Appl. No.: 780,451

[22] Filed: Mar. 23, 1977

[51] Int. Cl.$^3$ .............................................. C10M 3/44
[52] U.S. Cl. ....................................... 252/28; 252/316
[58] Field of Search ..................................... 252/21, 28

[56] References Cited

U.S. PATENT DOCUMENTS

| | | | |
|---|---|---|---|
| 2,531,440 | 11/1950 | Jordan | 252/28 |
| 2,966,506 | 12/1960 | Jordan | 260/448 |
| 3,514,401 | 5/1970 | Armstrong et al. | 252/28 |
| 3,929,849 | 12/1975 | Oswald | 260/448 C |
| 3,974,125 | 8/1976 | Oswald et al. | 260/40 R |
| 4,116,866 | 9/1978 | Finlayson | 252/28 |

FOREIGN PATENT DOCUMENTS 1190383  5/1970  United Kingdom .

OTHER PUBLICATIONS

Jordan et al.; "Organophylic Bentonites III, Inherent Properties"; Journal Kolliod-Zeitschrift, 137, 40–49 (1954).
Graham et al.; J. Am. Ceram. Soc.; 21, pp. 176–183 (1938).
McActee; American Mineralogist, 4, pp. 1230–1236 (1955).
Jordan; J. Phys. Colloid Chem., 53, pp. 294–305 (1950).
Jordan et al.; J. Phys. Coll. Chem., 54, pp. 1196–1207 (19509).
Theng; "The Chemistry of Clay Reactions"; pp. 224, 229–232 (1974).
Kennedy et al.; Nat. Lub. Grease Inst. Spokesman, 29 (5), pp. 138–145 (1965).
McAtee; Nat. Lub. Grease Inst. Spokesman, 33 (2), pp. 51–60 (1969).
GK; Technical Data Bulletin; "Rapid Evaluation Procedures for Astra-Tone 40 in Coating Systems"; Oct. 1972.
Crookshank et al.; "The Evaluation of Components for Nonsoap Thickened Greases"; NLGI Spokesman; 41 (3), pp. 81–86 (Jun. 1977).

Primary Examiner—Lewis T. Jacobs
Attorney, Agent, or Firm—Albert P. Halluin

[57] ABSTRACT

Polyolefin lubricant base oils can be surprisingly gelled by layer and chain type overtreated higher dialkyl dimethyl ammonium clays preferably containing a minimum of 12% excess of the quaternary ion moiety over their ion exchange capacity. For example, an overtreated dihydrogenated ditallow ammonium montmorillonite containing a 22% excess of the quaternary ion can be used to prepare a polydecene based grease although it does not gel mineral oil lubricants. In contrast, the known clay analog of equivalent treatment gels the mineral oil but not the synthetic polyolefin lubricant under comparable conditions.

15 Claims, No Drawings

POLYOLEFIN BASED GREASES GELLED BY CLAYS OVERTREATED BY HIGHER DIALKYL DIMETHYL AMMONIUM SALTS

FIELD OF THE INVENTION

This application relates to novel paraffinic hydrocarbon based thixotropic compositions gelled by layer and chain type clays overtreated by higher dialkyl dimethyl ammonium salts. More particularly, this invention relates to novel greases comprising polyolefin base fluids derived from $C_8$ to $C_{12}$ n-olefins and dihydrogenated ditallow dimethyl ammonium montmorillonite clay gellants preferably containing a 12 to 25% excess amount of the ammonium moiety of the clay as expressed in milliequivalents per 100 g. dry clay and as determined by the amount of ammonium acetate which reacts with the clay when an excess of ammonium acetate is used as a reactant.

The overtreatment of montmorillonite clays by the dihydrogenated ditallow dimethyl ammonium salt specifically in the chloride is surprisingly essential to its synthetic, hydrogenated polyolefin, e.g., polydecene, gelling ability. Concurrently, such an overtreatment adversely affects the grease gellant properties of the clay in mineral oil based lubricating fluids.

DESCRIPTION OF THE PRIOR ART

Layered higher dialkyl dimethyl ammonium clays containing ammonium groups equivalent to the ion exchange capacity of the starting inorganic clay are known gellant components for greases. The gellant properties which are essential in the grease application of such clays were reviewed by J. W. Jordan and F. J. Williams in an article, entitled "Organophylic Bentonites III, Inherent Properties" (Kolloid-Zeitschrift 137, 40–48 (1954). Patents covering such greases are among the basic patents in this field, by Jordan, assigned to NL Industries.

In general, the quaternary ammonium clays previously studied for grease applications are products of equivalent treatment of an inorganic clay by a quaternary ammonium salt, e.g.

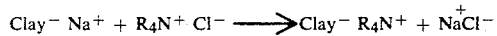

| Dispersed in water | Dissolved in water | Precipitated from water | Dissolved in water |

For example, one of the Jordan patents, U.S. Pat. No. 2,531,440 defines such a grease gellant as a quaternary ammonium derivative of a clay in which the exchangeable inorganic cations were replaced by the organophilic ammonium cation to an extent sufficient to swell, i.e., gel, nitrobenzene. Another, U.S. Pat. No. 2,966,506, describes such gellants, such as dioctadecyl dimethyl ammonium montmorillonite, as being derived by reacting e.g. sodium montmorillonite with the appropriate quaternary ammonium salt in amounts corresponding to the ion exchange capacity of the clay as determined by the ammonium acetate method [Graham and Sullivan, J. Am. Ceram. Soc. 21, 176–183 (1938)]. Publications related to the grease applications of commercial dioctadecyl dimethyl ammonium montmorillonite, i.e. Bentone 34, are also concerned with a typical product of equivalent treatment. For reference, see J. V. Kennedy and W. T. Granquist, Nat. Lub. Grease Inst. Spokesman, 29(5) 138–145 (1965) and J. L. McAtee, Nat. Lub. Grease Inst. Spokesman 33, 52–60 (1969).

More specifically, the use of quaternary ammonium clays as gellants for hydrogenated polyolefin based greases was described by E. L. Armstrong, R. A. Butcosk and G. W. Murray of Mobil Oil Corp. in U.S. Pat. No. 3,514,401. The quaternary clays of this patent were again the result of equivalent clay treatment. One of the clays used in the examples of this patent was Bentone 34, a commercial dihydrogenated ditallow, dimethyl ammonium montmorillonite clay product of NL Industries, i.e., a Bentonite derived from a sodium montmorillonite from Wyoming.

The exchange of the sodium and calcium cations of a Wyoming montmorillonite, i.e. bentonite, having an ion exchange capacity of 92 me by various amounts of quaternary dimethyl dioctadecyl ammonium chloride was studied in aqueous media by J. L. McAtee of the National Lead Co. [American Mineralogist, 4, 1230–1236, (1955)]. However, McAtee did not disclose either the properties of the overtreated clays or their uses. However, J. W. Jordan reported previously [J. Phys. Colloid Chem. 53, 294–305, (1950) at page 304] that the swelling in nitrobenzene of a higher dialkyl dimethyl montmorillonite, i.e., dodecyl hexadecyl dimethyl ammonium bentonite, was adversely affected by overtreatment. Since the swelling of organo-clays usually parallels their gelling ability, this Jordan publication is an indication of the adverse effects of overtreatment on gelling efficacy. A similar adverse indication is provided in another paper by J. W. Jordan, B. J. Hook and C. M. Finlayson (J. Phys. Coll. Chem. 54, 1196–1207 (1950) at page 1203) on the gel strength of toluene thickened by primary octadecyl ammonium bentonites of varying treatment level.

A recent monograph entitled "The Chemistry of Clay Organic Reactions" by B. K. G. Theng, a Holstead Press Book published by J. Wiley & Sons, New York (1974) particularly Chapter 5, pages 224, 229 to 232, makes it clear that the effect of clay overtreatment depends on the structure of the ammonium salt reactants. With regard to the properties of the organic ammonium clay products Theng stated that the hydrophilic character reaches a minimum, i.e. the lipophilic character a maximum at the ion exchange capacity. That means that on the basis of the prior art no improved organophilic gellants were expected from the overtreatment of clays.

In a copending application of A. A. Oswald and H. W. Barnum, i.e., Ser. No. 780,450, filed Mar. 23, 1977; entitled "Overtreated Higher Dialkyl Dimethyl Ammonium Clay Gellants" (Case C-340) the disclosure of which is incorporated herein by reference, it is disclosed that the overtreated higher dialkyl dimethyl ammonium clays used in the present invention surprisingly gel highly polar polyesters but are relatively ineffective in gelling aromatic hydrocarbons of less polar character.

THE DISCOVERY OF THE INVENTION

In contrast to the prior art, it has now been discovered that novel higher dialkyl dimethyl ammonium clays, particularly montmorillonites of unexpectedly desirable gellant properties in polyolefins are obtained via overtreatment. These polyolefins, e.g. polydecene, will provide greases, when mixed with the overtreated ammonium clays, such as dihydrogenated ditallow dimethyl ammonium montmorillonite. No grease is obtained under the same conditions when the corresponding clay of equivalent treatment is used.

The inherent gelling properties of the novel overtreated clay gellants for polyolefins are surprisingly different from those of the known clay gellants of equivalent treatment, in general. While the present gellants are unexpectedly superior in polyolefins, the known gellants are better in greases based on the more polar mineral oil based lubricant fluids.

The improvement represented by the present synthetic hydrocarbon lubricant, e.g. polydecene, based grease compositions is particularly significant since such lubricants can be used over a wide range of operating conditions from very low to high temperatures. These characteristics are highly desirable in aircraft applications where extremes in temperatures are frequently encountered.

SUMMARY OF THE INVENTION

Quaternary higher dialkyl dimethyl ammonium montmorillonite clay products containing ammonium ions in a concentration equivalent to the ion exchange capacity of the starting clay are known gellants for mineral oil based greases. However, these clays do not gel synthetic polyolefin based lubricating fluids under the same conditions. In contrast, overtreated higher dialkyl dimethyl ammonium montmorillonites can be used for gelling synthetic polyolefin based lubricating fluids.

In one aspect of the present invention, there are disclosed compositions comprising higher dialkyl dimethyl ammonium clay compositions of layer and chain type structure which contain ammonium ions in excess of the ion exchange capacity of the clay as expressed in milliequivalents per 100 g. dry clay and as determined by the amount of ammonium acetate which reacts with the clay when an excess of ammonium acetate is used as a reactant and a polyolefin of aliphatic, preferably paraffinic character.

In another aspect of the present invention it is shown that certain such products comprising overtreated clay and polyolefin are unexpectedly useful greases.

DESCRIPTION OF THE PREFERRED EMBODIMENTS

Product Compositions

Clays

The quaternary higher dialkyl dimethyl ammonium clay components of the compositions of the present invention possess layer and chain type structures and the general formula:

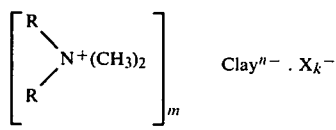

wherein R is an independently selected $C_8$ to $C_{35}$ saturated n-alkyl group. It is preferred that R ranges from $C_{14}$ to $C_{22}$. In the most preferred case R ranges from $C_{16}$ to $C_{18}$. It is specifically preferred that R be a hydrogenated tallow group. The term "clay" designates a layered or fibrous crystalline aluminosilicate of high ion exchange capacity and mineral origin. Sodium and unsubstituted ammonium aluminosilicates having 25 to 200 milliequivalent (me) of exchangeable cations per 100 g. are preferred. Even more preferred are clays having ion exchange capacities ranging from 50 to 170 m3 per 100 g. The most preferred clays have 80 to 120 me ion exchange capacity per 100 g. Layered type clays are structurally preferred, particularly the three layer class. It is most preferred to use a montmorillonite type clay in the sodium salt form.

The symbol "X" represents an anion selected from the group consisting of chloride, $C_1$ to $C_{18}$ carboxylate, sulfates, $C_2$ to $C_8$ dialkyl phosphate or phosphite, $C_1$ to $C_{18}$ sulfonate such as formate, octanoate, dimethyl phosphate, dibutyl phosphite, methane sulfonate, dodecylbenzenesulfonate. X is preferably chloride or acetate and most preferably chloride.

The symbols m and n are positive integers, with the proviso that m is greater than n. The symbol "m" represents the number of quaternary ammonium cations in the composition and the symbol "n" represents the number of negative changes on an aluminosilicate moiety, i.e., particles which are balanced by exchangeable cations in the starting inorganic clay. The symbol "n" is related to ion exchange capacities of clays as discussed in the monograph entitled "Clay Mineralogy" by R. E. Grim, published by McGraw Hill, Inc. New York (1968). These ion exchange capacities are known on the basis of the extent of the sodium clay plus excess ammonium acetate reaction and are expressed on a milliequivalent (me) ammonium ion per 100 g. dry clay basis.

As a consequence, the compositions can contain some X anions, e.g., chloride anions, to help to preserve the principle of electroneutrality of salts. The symbol "k" in the formula represents the number of anions. As such, "k" can range from 0 to m−n. It is, however, preferred that k be 1 to 50. The difference between n and m is preferably 5 to 30. Most preferably, k ranges from 12 to 25.

In the case of a typical Wyoming sodium montmorillonite, the values of the above numbers may range as follows: n=80–100; m=102–116, preferably 105 to 111; k=0 to 20, preferably 1 to 10. Optimum products are derived in ion exchange reactions by maximizing the value of m and minimizing that of the k.

Exemplary compositions are dioctyl, ditetradecyl, dihexadecyl, dioctadecyl, diheptadecyl, dieicosyl, didocosyl, ditriacontyl and dipentatriacontyl dimethyl ammonium derivatives of montmorillonite, hectorite, attapulgite, vermiculite, etc., containing, e.g. chloride anions.

In terms of overtreatment, the overtreated clays preferably contain a minimum of 12% excess more preferably a 12 to 25 excess, most preferably a 15 to 20% excess of the quaternary ion moiety above the ion exchange capacity of the clay and are prepared in the manner disclosed in an earlier referred, copending application by Oswald and Barnum, U.S. Ser. No. 780,450, filed Mar. 23, 1977.

Polyolefins

The polyolefin components of the present compositions are preferably derived from $C_2$ to $C_{12}$ olefins, more preferably from $C_8$ to $C_{12}$ olefins.

The $C_8$ to $C_{12}$ polyolefin components are preferably derived from α-olefins. It is furthermore preferred that said α-olefins be polymerized by cationic catalysts. During the polymerization the α-olefins can undergo isomerization reactions which increase the branchiness of the polyolefin products. A high degree of branching of the polyolefin base fluids is preferred because it reduces their pour points. However, long straight alkyl segments are desired for an increased interaction with the gelling agent and stability.

The preparation of preferred polyolefin components is illustrated in U.S. Pat. Nos. 3,149,178; 3,156,736 and 3,842,134. The polyolefin components are more preferably hydrogenated in a subsequent treating process to saturate all the double bonds. A detailed description of conducting such a treatment is found in U.S. Pat. No. 3,149,178. The resulting polyolefin derived products of completely saturated aliphatic, i.e. paraffinic character are of superior stability.

Greases

The present compositions, preferably comprising major amounts, preferably 80 to 95%, of $C_3$ to $C_8$ polyolefin lubricating base fluids and minor amounts, preferably 5 to 15%, of overtreated higher dialkyl dimethyl ammonium montmorillonite gellants, possess preferred viscosity behavior, i.e., rheology, stability and lubricating characteristics. These properties allow their advantageous application as greases. The greases containing compositions of the present invention preferably contain a high temperature oxidation inhibitor preferably in amounts ranging from 0.2 to 5 percent. Useful classes of such inhibitors are aromatic, preferably diphenyl and 2-naphthyl, amines hindered phenols and bis-phenols. In addition to the inhibitors, the present greases also contain corrosion inhibitors such as sodium nitrite. The preferred inhibitors are hindered bisphenols.

Plastics and Elastomers

The present compositions can be also used in reinforced plastics and elastomers applications. For such applications, the preferred polymers are derived from $C_3$ to $C_6$ olefins. Exemplary polymers are polypropylene, hydrogenated copolymers of butadiene and styrene, ethylene-propylene-diene terpolymers. The method of such applications is described in U.S. Pat. No. 2,531,396.

Grease Preparation and Evaluation

The preparation of the present grease compositions usually starts with the mixing of the ammonium clay gellant and the polyolefin base fluid. Then minor amounts of a polar organic additive, e.g. acetone or propylene carbonate and then water can be added to help the dispersion on further mixing of the gellant in the base fluid. The volatile dispersion aids are then removed by heating. Thereafter, other additives such as inhibitors are added, usually as solutions in the base fluid. The complete composition is then finally dispersed preferably using a three roll paint mill or a colloid mill with a preferred clearance of 0.2-2 microns.

The laboratory evaluation of the hardness of the grease compositions can be simply determined by a micropenetration test. The values of this test are related to the viscosity of the grease under moderate shear conditions. A somewhat more detailed evaluation of grease hardness is provided by a full scale penetration test. In this test, the penetration values are also determined for the grease after being worked at 60 and 10,000 strokes. The latter data reflect the ability of the grease system to withstand prolonged exposure to low shear mechanical stresses.

EXAMPLE 1

Comparison of Overtreated and Normally Treated Dimethyl Dihydrogenated Ditallow Ammonium Montmorillonite Clay Gellants for Polydecene in Penetration Tests Into a 250 ml beaker are weighed 15.0 g. of oil base and 6.3 g. of ammonium clay. After mixing the clay into the oil base with a flat tipped spatula, 0.38 g. of polar additive (propylene carbonate or acetone) is added with continued mixing. Then, an additional 35.02 g. of oil base is blended into the mixture. Finally 0.30 g. of water is added with continued mixing. The 250 ml. beaker containing the grease composition is placed on a hot plate and the grease intermittently hand stirred with a thermometer for 15 mins. of 110°–140° C. The grease is allowed to cool and worked through a 3-roll mill at a 0.9 setting.

The grease is transferred to a 30 ml. narrow top crucible and the surface of the grease made absolutely smooth and level with the rim of the crucible.

Micro-penetration values are then obtained at 25°±1° C. with a straight taper cone according to ASTM D 1403-69. The straight taper cone modification of the test is described in "The Lubrication Engineer's Manual", edited by C. A. Bailey and J. S. Aarons, published by U.S. Steel Corporation (1966). The results are shown in Table I.

TABLE I

GELLING OF POLYDECENE BASE FLUID[a] BY 11% OF AN OVERTREATED AND NORMALLY TREATED AMMONIUM CLAY AS MEASURED IN A PENETRATION TEST[b]

| Seq. No. | Clay Exp. No. E- | Quaternary Cation Structure | Quaternary Level, me per 100 g. clay | Micro-Penetration, mm. × 0.1 | Full Scale Penetration, mm × 0.1 |
|---|---|---|---|---|---|
| 1 | 2811-I[c] | $(C_{18}H_{37})_2N^+(CH_3)_2$[d] | 90 | 152 | Too soft |
| 2 | 2690-III[e] | $(C_{18}H_{37})_2N^+(CH_3)_2$[d] | 110 | 60 | 284 |

[a]Polydecene, ESH 400 from, Ethyl Corp., having a viscosity of 19 centistokes at 100° F. and about 10 olefin units per molecule.
[b]Micropenetration test according to ASTM D 1403-69 using a cone with a modified tip. Full scale penetration test according to ASTM D 217.
[c]Georgia Kaolin's product, Astratone 40.
[d]Dimethyl ditallow ammonium group derived from the technical chloride salt, Adogen 440 of the Ashland Oil Co.
[e]Derived from the same Wyoming sodium montmorillonite as Astratone 40.

A comparison of the penetration data of Table I shows that in contrast to the normally treated clay the overtreated clay provided a hard polydecene grease.

A comparison of the gelling effectiveness of the overtreated and normally treated ammonium clay was also made in a solvent extracted high viscosity mineral lubricating oil base. This mineral oil contained only 11.1% paraffins. In addition, it had a 57.3% naphthenes, 29.1% aromatic hydrocarbons and 2.4% polar non-hydrocarbon compounds.

Grease compositions based on the above mineral oil and the two clays were prepared again on an 11% gellant basis. Micropenetration values were determined.

The comparative results are shown by the following tabulation:

| Quaternary Level, me per 100 g. Clay | Micropenetration mm × 0.1 |
|---|---|
| 90 | 49 |
| 100 | 83 |

The data show that, in contrast to the results in polydecene, the commercial type clay of equivalent treatment level was a much more effective gellant in the mineral oil

EXAMPLE 3

Gelling of Polydecene by Overtreated Dimethyl Dihydrogenated Ditallow Ammonium Montmorillonite Clay in the Presence of Various Antioxidants.

Into a 250 ml. beaker are weighed 15.0 g. of oil base and 6.3 g. of organo clay. After mixing the clay into the oil base with a flat tipped spatula, 0.38 g. of polar additive (propylene carbonate or acetone) is added with continued mixing. Meanwhile, 0.57 g. of antioxidant is dissolved in 35.02 g. of oil based by heating the oil at 60° C. in a water bath. The oil portion containing the antioxidant is allowed to cool to room temperature and is mixed with the other portion. Finally, 0.30 g. of water is added with continued mixing with a flat tipped spatula. The grease composition is then either heated and worked as described in the previous example or handled according to a modified procedure as follows:

In a modification of the micropenetration test, the final grease composition is transferred into a crystallizing dish (12.5×6.5 cm) and distributed evenly over the bottom and sides of the dish. The dish is then placed in a vacuum oven (=1.0 mm) at 60° C. for 30 mins. to remove the water and acetone. The grease is allowed to cool and worked through a 3-roll mill at a 0.9 setting.

Micropenetration values are obtained in the same manner as usual. The data of the greases prepared by both the regular and modified method are shown in Table II.

The data show that all three types of additives could be used in the present greases without any large effect on grease hardness. The use of the hindered phenol had no adverse effect on the gel at all. The small adverse effect of the amines could be counteracted by an increased concentration of the clay gellant. The preferred polar additive was propylene carbonate.

TABLE II

GELLING OF POLYDECENE BASE FLUID BY OVER-TREATED AMMONIUM CLAY[a] IN THE PRESENCE OF VARIOUS ANTIOXIDANTS AS MEASURED IN A MICROPENETRATION TEST[b]

| Seq. No. | Clay Gelled % | Propylene Carbonate | Acetone | Micropenetration[c], mm × 0.1 in the Presence of Antioxidant Added, 1% | | |
|---|---|---|---|---|---|---|
| | | | | Naphthyl Amine[d] | Diphenyl Amine[e] | Hindered Diphenol[f] |
| 1 | 11 | Yes | — | 90 | 80 (77$^g$) | 69 (57$^g$) |
| 2 | 13 | Yes | — | 58 | 59 (62$^g$) | 47 (62$^g$) |
| 3 | 11 | — | Yes | 78 | 75 | 63 |

[a]Sodium montmorillonite treated with 110 me per 100 g. clay of dimethyl dihydrogenated ditallow ammonium chloride as in Table I.
[b]Micropenetration test according to ASTM D 1403-69.
[c]Most of the test procedures controlled the temperature of the removal of polar dispersants by the modified procedure.
[d]Phenyl-2-naphthyl amine.
[e]Bis.-4-isooctylphenyl-amine, Vanlube 81.
[f]4,4'-Methylene-bis-(2,6-di-t-butyl phenol) Ethyl 702.
[g]Original dispersant removal procedure, producing scattered results.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A grease composition comprising a mixture of
    (a) a higher dialkyl dimethyl ammonium clay gellant of layer and chain type structure containing ammonium ions in excess of the ion exchange capacity of the clay as expressed in milliequivalents per 100 g dry clay and as determined by the amount of ammonium acetate which reacts with the clay when an excess of ammonium acetate is used as a reactant,
    (b) a polyolefin of aliphatic character as a base fluid wherein said gellant and base fluid are employed in sufficient amounts to provide desired viscosity behavior in said grease.

2. The composition of claim 1 wherein the clay is a dihydrogenated ditallow dimethyl ammonium montmorillonite.

3. The composition of claim 1 wherein the concentration of the ammonium ions ranges from about 12 to about 25% above the ion exchange capacity of the clay.

4. A grease composition comprising a mixture of
    (a) a minor amount of a higher dialkyl dimethyl ammonium clay gellant of layer and chain type structure containing ammonium ions in excess of the ion exchange capacity of the clay as expressed in milliequivalents per 100 g dry clay and as determined by the amount of ammonium acetate which reacts with the clay when an excess of ammonium acetate is used as a reactant, and
    (b) a major amount of a $C_8$ to $C_{12}$ polyolefin as a lubricant base fluid wherein said gellant and base fluid are employed in sufficient amounts to provide desired viscosity behavior to said grease.

5. The composition of claim 4 wherein the clay is a dihydrogenated ditallow dimethyl ammonium montmorillonite.

6. The composition of claim 5 wherein the polyolefin is hydrogenated to provide a completely saturated aliphatic hydrocarbon.

7. A grease composition comprising
   (a) 5 to 15% of a higher dialkyl dimethyl ammonium clay gellant of layer and chain type structure containing ammonium ions in excess of the ion exchange capacity of the clay as expressed in milliequivalents per 100 g dry clay and as determined by the amount of ammonium acetate which reacts with the clay when an excess of ammonium acetate is used as a reactant, and
   (b) 80 to 95% of a $C_8$ to $C_{12}$ polyolefin lubricant base fluid.

8. The grease composition of claim 1 wherein the clay is a dihyrogenated ditallow dimethyl ammonium montmorillonite.

9. A grease composition comprising
   (a) a minor amount of a dihydrogenated ditallow dimethyl ammonium montmorillonite gellant containing ammonium ions in excess of the ion exchange capacity of the clay as expressed in milliequivalents per 100 g. dry clay and as determined by the amount of ammonium acetate which reacts with the clay when an excess of ammonium acetate is used as a reactant, and
   (b) a hydrogenated polydecene lubricant base fluid.

10. A grease composition comprising:
    (a) 5 to 15% of a higher dialkyl dimethyl ammonium clay gellant of layer and chain type structure containing ammonium ions in excess of the ion exchange capacity of the clay as expressed in milliequivalents per 100 g dry clay and as determined by the amount of ammonium acetate which reacts with the clay when an excess of ammonium acetate is used as a reactant,
    (b) 80 to 95% of $C_2$ to $C_{12}$ polyolefin lubricant base fluid, and
    (c) minor amounts of inhibitor additives.

11. The composition of claim 10 wherein the gellant component of said grease is an overtreated dihydrogenated ditallow dimethyl ammonium montmorillonite.

12. The composition of claim 10 wherein the lubricant base fluid component of said grease composition is a $C_8$ to $C_{12}$ polyolefin.

13. The composition of claim 10 wherein the additive components of said grease composition are selected from the group consisting of oxidation inhibitors and corrosion inhibitors.

14. The composition of claim 10 wherein the oxidation inhibitors are selected from the group consisting of aromatic amines, hindered phenols and hindered bisphenols.

15. A grease composition comprising:
    (a) 5 to 15% of a dihydrogenated ditallow dimethyl ammonium montmorillonite gellant containing ammonium ions in excess of the ion exchange capacity of the clay as expressed in milliequivalents per 100 g dry clay and as determined by the amount of ammonium acetate which reacts with the clay when an excess of ammonium acetate is used as a reactant,
    (b) 80 to 95% of a hydrogenated polydecene lubricant base fluid, and
    (c) 0.2 to 5% of a hindered bis-phenol antioxidant.

* * * * *